(12) United States Patent
Ikeya et al.

(10) Patent No.: US 9,810,569 B2
(45) Date of Patent: Nov. 7, 2017

(54) MEASURING DEVICE FOR MEASURING PROPERTY OF FUEL INSIDE FUEL TANK

(71) Applicants: AISAN KOGYO KABUSHIKI KAISHA, Aichi-ken (JP); Toyota Jidosha Kabushiki Kaisha, Aichi-ken (JP)

(72) Inventors: Masaki Ikeya, Aichi-ken (JP); Nobuhiro Kato, Aichi-ken (JP); Chiaki Kataoka, Aichi-ken (JP)

(73) Assignees: AISAN KOGYO KABUSHIKI KAISHA, Obu-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 300 days.

(21) Appl. No.: 14/470,929

(22) Filed: Aug. 27, 2014

(65) Prior Publication Data

US 2015/0059470 A1    Mar. 5, 2015

(30) Foreign Application Priority Data

Aug. 29, 2013    (JP) ................................. 2013-177757

(51) Int. Cl.
    *G01F 23/30*      (2006.01)
    *G01F 23/00*      (2006.01)
    *B60K 15/03*      (2006.01)

(52) U.S. Cl.
    CPC ............. *G01F 23/30* (2013.01); *B60K 15/03* (2013.01); *B60K 2015/03217* (2013.01); *B60K 2015/03447* (2013.01); *G01F 23/0007* (2013.01)

(58) Field of Classification Search
    CPC ....................................................... G01F 23/30
    (Continued)

(56) References Cited

U.S. PATENT DOCUMENTS

| 2005/0100461 A1 | 5/2005 | Izutani |
| 2009/0193873 A1 | 8/2009 | Nakamura |

(Continued)

FOREIGN PATENT DOCUMENTS

| CA | 2654102 A1 | 1/2008 |
| JP | S62-35088 | 2/1987 |

(Continued)

OTHER PUBLICATIONS

English Abstract of Japanese Patent Application No. JP 2012-108030.

(Continued)

*Primary Examiner* — David M Gray
*Assistant Examiner* — Andrew V Do
(74) *Attorney, Agent, or Firm* — Vierra Magen Marcus LLP

(57) ABSTRACT

A measuring device may be provided with a cover configured to close an opening provided on a fuel tank; a plug configured to close a through hole provided on the cover; and a sensor configured to measure a property of fuel inside the fuel tank. The plug may be provided with an electrical connector and a fuel passage. The electrical connector may be configured to electrically connect inside and outside of the fuel tank. The electrical connector may pierce through the plug from an upper surface to a lower surface of the plug. The fuel passage may include an inlet configured to open to the inside of the fuel tank to receive the fuel from the inside of the fuel tank. The sensor may be disposed in the fuel passage of the plug.

2 Claims, 8 Drawing Sheets

(58) Field of Classification Search
USPC .......................................................... 73/313
See application file for complete search history.

(56) References Cited

U.S. PATENT DOCUMENTS

| | | |
|---|---|---|
| 2009/0303466 A1 | 12/2009 | Arakawa et al. |
| 2010/0011844 A1* | 1/2010 | Yanagi .................. G01N 25/20 73/61.76 |
| 2012/0126835 A1* | 5/2012 | Nakamura ......... G01N 33/2852 324/663 |
| 2012/0227707 A1 | 9/2012 | Sasai et al. |
| 2013/0220999 A1 | 8/2013 | Usui |

FOREIGN PATENT DOCUMENTS

| | | | |
|---|---|---|---|
| JP | 2001214826 A | * | 8/2001 |
| JP | 2005-155602 | | 6/2005 |
| JP | 2008014741 A | | 1/2008 |
| JP | 2009-180159 | | 8/2009 |
| JP | 2009-542510 A | | 12/2009 |
| JP | 2012-108030 | | 6/2012 |
| JP | 2012189017 A | | 10/2012 |
| WO | 2012066648 A1 | | 5/2012 |

OTHER PUBLICATIONS

Machine Translation prepared by the Japanese Patent Office of Japanese Patent Application No. JP 2012-108030.
English Abstract of Japanese Patent Application No. JP 2009-180159.
Machine Translation prepared by the Japanese Patent Office of Japanese Patent Application No. JP 2009-180159.
English Abstract of Japanese Patent Application No. JP 2005-155602.
Machine Translation prepared by the Japanese Patent Office of Japanese Patent Application No. JP 2005-155602.
English Abstract of Japanese Patent Application No. JP S62-35088.
Office Action dated Nov. 29, 2016 in Japanese Patent Application No. 2013-177757, with English translation.
Office Action dated Aug. 25, 2016 in Japanese Patent Application No. 2013-177757, with English translation.
English Abstract of JP2008014741 published Jan. 24, 2008.
English Abstract of JP2012189017 published Oct. 4, 2012.

* cited by examiner

MEASURING DEVICE FOR MEASURING PROPERTY OF FUEL INSIDE FUEL TANK

CROSS-REFERENCE TO RELATED APPLICATION

This application claims priority to Japanese Patent Application No. 2013-177757 filed on Aug. 29, 2013, the contents of which are hereby incorporated, by reference into the present application.

TECHNICAL FIELD

This specification relates to a measuring device configured to measure a property of fuel stored in a fuel tank.

DESCRIPTION OF RELATED ART

A measuring device disclosed in Japanese Patent Application Publication No. 2012-108030 has a fuel passage formed in a flange configured to close an opening formed in an upper wall of a fuel tank. An opening is formed at the fuel passage, and a housing is attached to the opening in the fuel passage. A fuel sensor is attached to the housing. Once the housing is attached to the opening in the fuel passage, the opening is closed by the housing and the sensor is positioned in the fuel passage. Herewith, a property of fuel flowing through the fuel passage is measured by the sensor.

SUMMARY

A fuel tank is required to ensure airtightness in order to prevent fuel stored therein from leaking out. Meanwhile, in order to supply the fuel stored in the fuel tank to an outside thereof, a fuel passage is needed which connects inside and outside of the fuel tank. Furthermore, since a fuel pump, a sensor, etc. are disposed in the fuel tank, an electrical connector (such as a wire) is needed as well, which connects a device inside of the fuel tank to a device (such as a power source) outside of the fuel tank. For this reason, with a cover configured to close an opening of the fuel tank, a plurality of components piercing through the cover, such as the electrical connector and the fuel passage is provided. Therefore, the prior art had a problem that a plurality of seal areas for ensuring airtightness exists and a structure thereof is complicated.

This specification discloses a technology for simplifying with a reduction in the number of seal areas by integrating components piercing through a cover.

A measuring device disclosed in this specification may detect a property of fuel in a fuel tank. This measuring device may comprise a cover configured to close an opening provided on a fuel tank, a plug configured to close a through hole provided on the cover, and a sensor configured to measure a property of fuel inside the fuel tank. The plug may comprise an electrical connector configured to electrically connect inside and outside of the fuel tank and a fuel passage. The electrical connector may pierce through the plug from an upper surface to a lower surface of the plug. The fuel passage may include an inlet configured to open to the inside of the fuel tank to receive the fuel from the inside of the fuel tank. The sensor may be disposed in the fuel passage of the plug.

In the measuring device described above, the electrical connector and the fuel passage, which pierce through the plug from the inside to the outside of the fuel tank, may be formed integrally with the plug, and the sensor may be disposed in the fuel passage. This configuration may allow the seal areas in the cover to be concentrated in a space between the plug and the through hole. The airtightness of the cover may be achieved with a simple structure.

DETAILED DESCRIPTION

Figure 1:
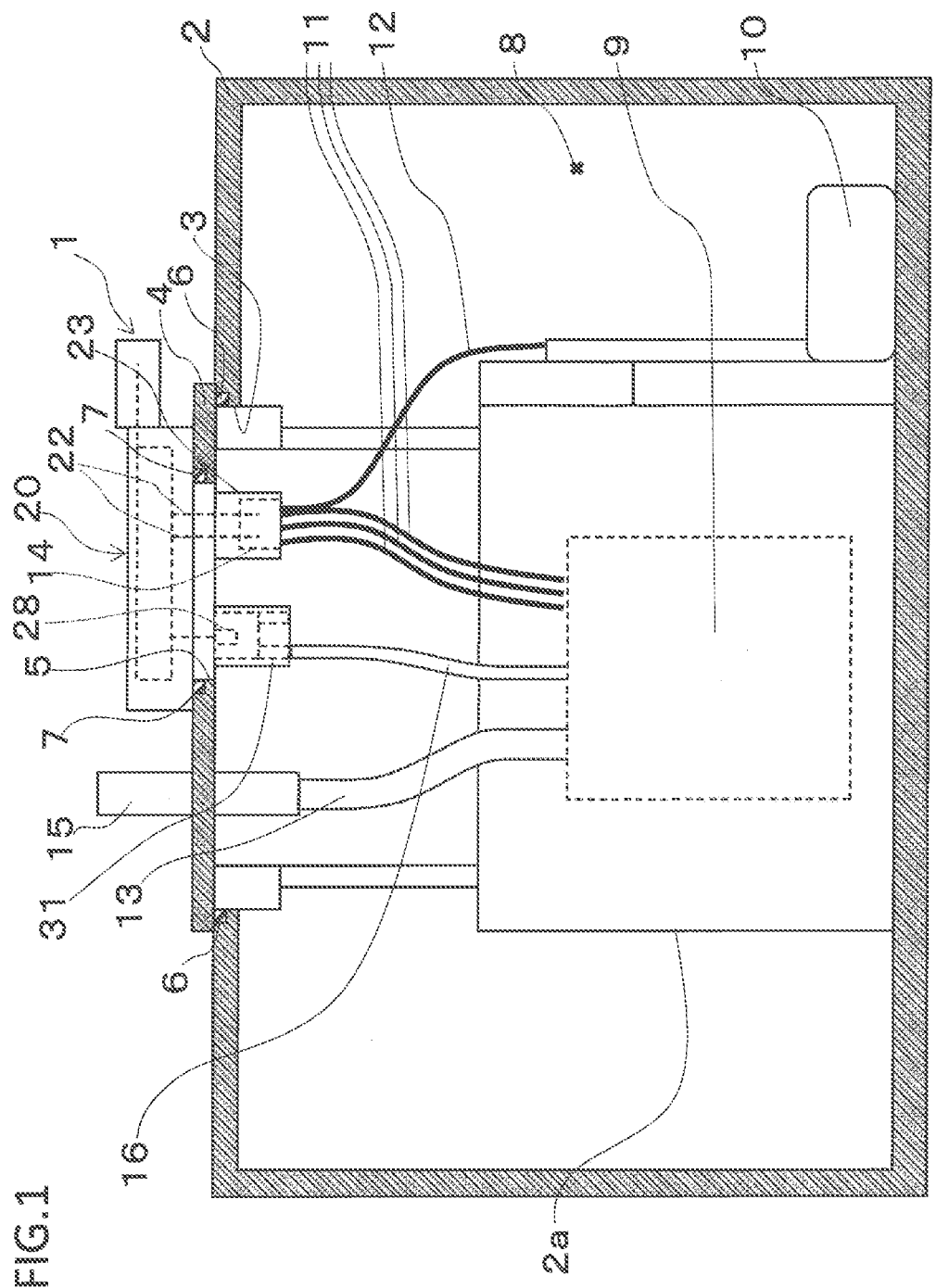
FIG. 1 shows an overall configuration of a fuel tank of a first embodiment.

Some of features of embodiments described herein will be listed. Notably, technical features described herein are each independent technical element, and exhibit technical usefulness thereof solely or in combinations.

(Feature 1) The fuel passage may include an outlet that is configured to open to the inside of the fuel tank to discharge the fuel from the fuel passage to the inside of the fuel tank. Such a configuration causes fuel having flowed from the fuel tank to the fuel passage to be returned into the fuel tank through the fuel passage. Since the fuel passage is used solely to measure a property of the fuel, the amount of flow of the fuel that passes through the fuel passage can be held constant, so that the precision of measurement may be stabilized.

(Feature 2) The outlet of the fuel passage may be open to the outside of the fuel tank. According to this configuration, a fuel passage for supplying the outside of the fuel tank with the fuel stored in the fuel tank and a fuel passage including a sensor for measuring a property of the fuel may be integrated in one place, thus making the structure simpler.

(Feature 3) One of the electrical connector and the fuel passage may be disposed around the other of the electrical connector and the fuel passage. According to this configuration, the electrical connector and the fuel passage may be concentrated in one place, thus making smaller the space in which they are disposed. Therefore, the size of the plug may be reduced and thereby the seal area between the cover and the plug may be reduced. The reliability of sealing performance may be improved.

(Feature 4) The measuring device may comprise a control circuit connected to the sensor and an electrical equipment disposed in the fuel tank. The plug further may comprise a circuit housing configured to house the control circuit. And in a case where the plug is assembled into the cover, the control circuit housed in the circuit housing may be located on the plug on the outside of the fuel tank. The control circuit for controlling the electrical equipment disposed in the fuel tank and the control circuit that receives a signal from the sensor may be integrated, thus the number of components may be reduced.

Representative, non-limiting examples of the present invention, will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved a measuring device, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

A measuring device 1 of this embodiment is placed on an upper surface of a fuel tank 2 mounted in an automobile or the like. As shown in FIG. 1, the measuring device 1 comprises a cover 4 configured to close an opening 3 disposed in an upper surface of the fuel tank 2. By the cover 4 closing the opening 3 in the upper surface of the fuel tank 2, the measuring device 1 is placed on the fuel tank 2. First, a configuration of the fuel tank 2 on which the measuring device 1 is placed is described.

As shown in FIG. 1, the fuel tank 2 is a container for storing fuel, and has a storage space 8 for storing fuel inside thereof. A reserve cup 2a is disposed in the storage space 8 of the fuel tank 2. The reserve cup 2a is disposed at the bottom of the fuel tank 2. A fuel pump unit 9 is housed in the reserve cup 2a. One end of a first fuel tubing 3 and one end of a second fuel tubing 16 is connected with the fuel pump unit 9. The fuel pump unit 9 sucks fuel inside of the reserve cup 2a (more particularly, fuel that flowed from the fuel tank 2 into the reserve cup 2a) through a suction opening (not illustrated), pressurizes the fuel inside of the fuel pump unit 9, and discharges the fuel into the first fuel tubing 13. The other end of the first fuel tubing 13 is connected to a discharge pipe 15 provided in the cover 14. For this reason, the fuel discharged from the fuel pump unit 9 into the first fuel tubing 13 is discharged out of the fuel tank 2 through a discharge pipe 15. The fuel discharged through the discharge pipe 15 is sent to an engine (not illustrated) placed outside of the fuel tank 2. Further, a pressure regulator (not illustrated) that regulates the pressure of the fuel thus pressurized is provided in the fuel pump unit 9. An excess of fuel discharged from the pressure regulator flows into the second fuel tubing 16. The other end of the second fuel tubing 16 is connected to the measuring device 1. As will be mentioned later, the measuring device 1 measures a property of the fuel flowing through the second fuel tubing 16. Further, one end of a first lead wire 11 is electrically connected to the fuel pump unit 9, and the other end of the first lead wire 11 is electrically connected to an electrical connecting unit 14. Further, one end of a second lead wire 12 is connected to the electrical connecting unit 14, and the other end of the second lead wire 12 is connected to a liquid level measuring device 10 disposed in the fuel tank 2. The liquid level measuring device 10 is a float-type liquid level measuring device, and measures a liquid level of the fuel stored in the fuel tank 2. The electrical connecting unit 14 is connected to a socket 23. An electrical connector 22 (to be described later) projects into the socket 23. Once the electrical connecting unit 14 is plugged into the socket 23, the lead wires 11 and 12 are connected to the electrical connector 22. The fuel pump unit 9 and the liquid level measuring device 10 are connected to an external power source through the lead wires 11 and 12, the electrical connecting unit 14, and the electrical connector 22.

Figure 2A:
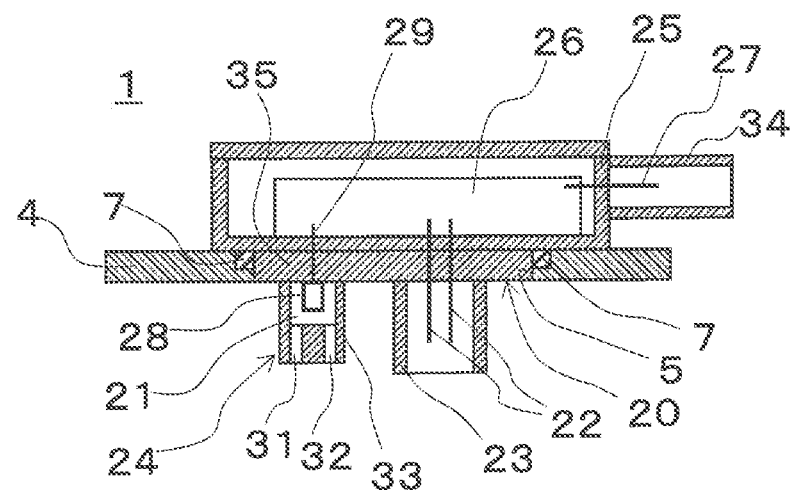
FIG. 2A shows a configuration of a measuring device of the first embodiment.
Figure 2B:
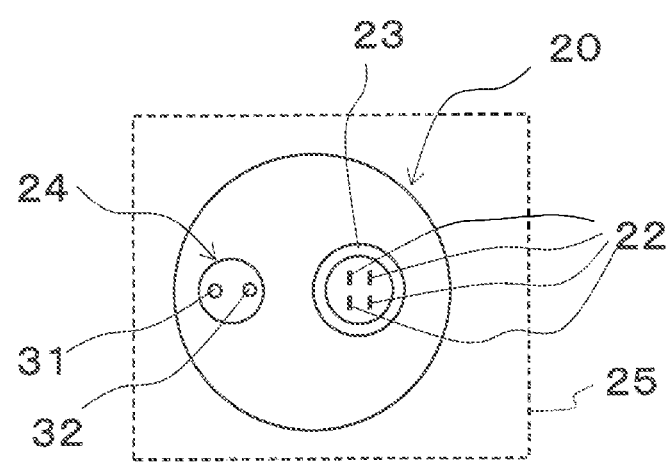
FIG. 2B is a bottom view of the measuring device of the first embodiment as seen from inside of the fuel tank.

Next, the measuring device 1 is described with reference to FIGS. 2A and 2B. As shown in FIGS. 2A and 2B, the measuring device comprises the cover 4, a plug 20, a fuel property sensor 28, and a sealing unit 7.

The cover 4 is a plate-like member sized to close the opening 3 in the upper surface of the fuel tank 2. A sealing unit 6 is disposed between a lower surface of the cover 4 and the upper surface of the fuel tank 2 (see FIG. 1). Once the cover 4 is attached to the opening 3 in the fuel tank 2, the gap between the cover 4 and the fuel tank 2 is sealed with the sealing unit 6. A through hole 5 and the discharge pipe 15 is provided in the cover 4. The first fuel tubing 13 is connected to the discharge pipe 15. The through hole 5 pierces through the cover 4 from an upper surface to the lower surface of the cover 4. The plug 20 is fitted in the through hole 5.

The plug 20 has a fitting unit 35, a circuit case 25 provided on an upper surface of the fitting unit 35, and a fuel measuring unit 24 provided on a lower surface of the fitting unit 35. The fitting unit 35 has an outer shape that corresponds to the through hole 5 of the cover 4. Once the plug 20 is attached to the cover 4, the fitting unit 35 of the plug 20 is fitted in the through hole 5. The sealing unit 7 is disposed on an outer circumferential surface of the fitting unit 35. Once the fitting unit 35 is fitted in the through hole 5, the gap between the fitting unit 35 and the through hole 5 is sealed with the sealing unit 7.

The fuel measuring unit 24 includes a casing 33 and a fuel property sensor 28 housed in an internal space 21 in the casing 33. The casing 33 has an inlet 31 and an outlet 32 that are configured to open to the inside of the fuel tank 2. The inlet 31 communicates with the outlet 32 through the internal space 21. As mentioned above, the second fuel tubing 16 is connected to the inlet 31 (see FIG. 1). This causes the fuel from the fuel pump unit 9 to flow through the second fuel tubing 16 into the inlet 31, flow from the inlet 31 through the internal space 21, and be returned into the fuel tank 2 through the outlet 32. Therefore, the internal space 21 serves as a fuel passage through which the fuel flows. The fuel property sensor 28 is a publicly-known sensor configured to measure a property (e.g. an alcohol concentration) of the fuel flowing through the internal space 21. One end of a lead wire 29 is connected to the fuel property sensor 28. The lead wire 29 pierces through the fitting unit 35, and the other end thereof is located in the circuit case 25.

As already described, the socket 23 is further formed on the lower surface of the fitting unit 35. The socket 23 is a cylindrical member, and opens to the bottom surface of the fuel tank 2 (see FIG. 1). The electrical connector 22 projects into the socket 23. That is, the electrical connector 22 is surrounded by the socket 23. As shown in FIG. 2B, the electrical connector 22 is configured by a plurality of connecting terminals (in the present embodiment, four, i.e. two by two). As with the lead wire 29, the four connecting terminals configuring the electrical connector 22 pierce through the fitting unit 35, and their ends locate in the circuit case 25.

The circuit case 25 comprises a bottom wall disposed on the upper surface of the fitting unit 35 and side walls standing from end edges of the bottom wall. An input-output unit 34 is formed on one of the side walls of the circuit case 25. A connecting terminal 27 projects into the input-output unit 34. The connecting terminal 27 extends into the circuit case 25 by piercing through the side wall of the circuit case 25. A power source wire (not illustrated) connected to the external power source is connected to the input-output unit 34. A control circuit 26 is housed in the space surrounded by the side walls of the circuit case 25. The aforementioned electrical connector 22, lead wire 29, and connecting terminal 27 are connected to the control circuit 26. Therefore, the control circuit 26 is connected to the external power source through the connecting terminal 27, the input-output unit 34, and the power source wire. Further, the control circuit 26 is connected to the fuel property sensor 28 through the lead wire 29, and is connected to the fuel pump unit 9 and the liquid level measuring device 10 through the electrical connector 22 and the lead wires 11 and 12, respectively. The control circuit 26, which operates on electric power supplied from the external power source, receives signals from the various detecting devices 10 and 28 and controls the fuel pump unit 9.

How the aforementioned measuring device 1 operates is described. Once electric power is supplied from the external power source to the fuel pump unit 9 through the control circuit 26, the fuel pump unit 9 starts operating. Once the fuel pump unit 9 starts operating, the fuel inside of the fuel tank 2 is sucked into the fuel pump unit 9, and is pressurized in the fuel pump unit 9. The fuel pressurized in the fuel pump unit 9 has its pressure regulated by the pressure regulator, and the fuel having its pressure regulated is discharged out of the fuel tank 2 through the first fuel tubing 13. Further, an excess of fuel that is discharged from the pressure regulator flows into the fuel measuring unit 24 through the second fuel tubing 16, and is returned into the fuel tank 2 through the fuel measuring unit 24. The fuel flowing through the fuel measuring unit 24 has its fuel property detected by the fuel property sensor 28. A signal that is outputted from the fuel property sensor 28 is inputted to the control circuit 26, and is processed in the control circuit 26. Further, the liquid level of the fuel inside of the fuel tank 2 is detected by the liquid level measuring device 10. A signal from the liquid level measuring device 10 is also inputted to the control circuit 26, and is processed in the control circuit 26.

In the aforementioned measuring device 1, the electrical connector 22 and the fuel measuring unit 24 are integrated with the plug 20. This makes it possible to limit the number of seal areas to two, i.e. one between the cover 4 and the plug 20 and the other between the cover 4 and fuel tank 2. Therefore, this makes it possible to seal the fuel tank with a smaller number of seal areas and thereby improve the airtightness of the fuel tank 2. Further, the control circuit 26 mounted on the plug 20 performs both a function of controlling the electric power that is supplied to the fuel pump unit 9 and a function of receiving signals from the various detecting devices 10 and 28. This makes it possible to simplify the configuration of the control system and reduce the number of components. Furthermore, since the plug 2 can be assembled to the cover 4 by being fitted in the cover 4, the measuring device 1 can be easily fabricated.

The excess of fuel discharged from the pressure regulator is sent to the fuel measuring unit 24. It should be noted here that the amount of flow of the excess of fuel is smaller than the amount of flow of the fuel that is supplied to the engine. For this reason, a variation in the amount of flow of the excess of fuel is small as well, so that the fuel property sensor 28 can measure a fuel property with a good precision.

Second Embodiment

A measuring device 1a of a second embodiment is described with reference to FIGS. 3A and 3B. The measuring device 1a of the second embodiment differs from the measuring device 1 of the first embodiment in that a fuel property sensor is disposed in a passage of a fuel that is supplied from the fuel pump unit 9 to the engine. The following explains points of difference from Embodiment 1.

Figure 3A:
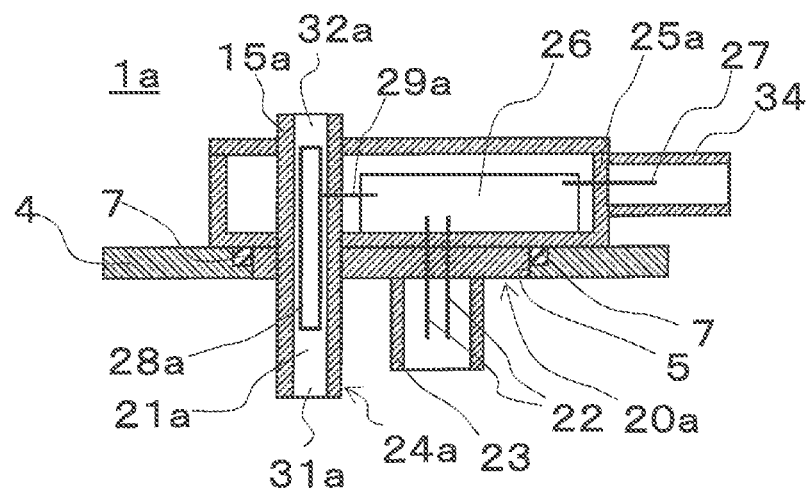
FIG. 3A shows a configuration of a measuring device of a second embodiment.
Figure 3B:
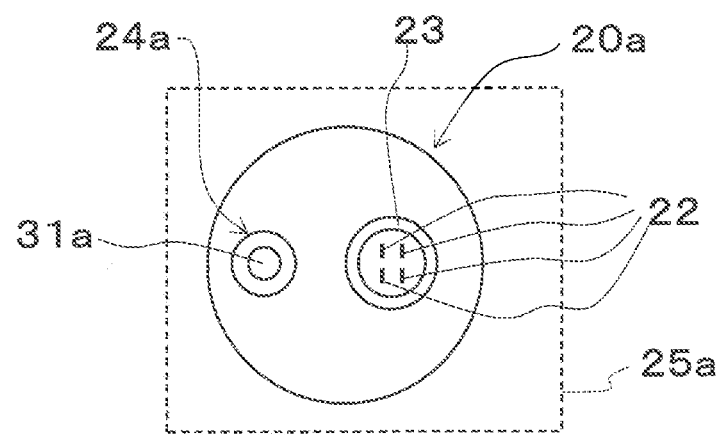
FIG. 3B is a bottom view of the measuring device of the second embodiment as seen from inside of the fuel tank.

As shown in FIGS. 3A and 3B, a discharge pipe 15a is provided in a plug 20a of second embodiment. The discharge pipe 15a pierces through the plug 20a from the inside to the outside of the fuel tank 2. The discharge pipe 15a has an inlet 31a configured to open to the inside of the fuel tank 2. The first fuel tubing 13 is connected to the inlet 31a. The discharge pipe 15a has an outlet 32a configured to open to the outside of the fuel tank 2. The outlet 32a is connected to the engine through a fuel tubing (not illustrated). A fuel property sensor 28a is disposed in the discharge pipe 15a. The fuel property sensor 28a detects a fuel property of fuel flowing through the discharge pipe 15a.

Such a configuration also makes it possible to reduce the number of seal areas and thereby improve the airtightness of the fuel tank 2. Further, the reduction in the number of components assembled leads to improvement in assemblage.

Figure 4:
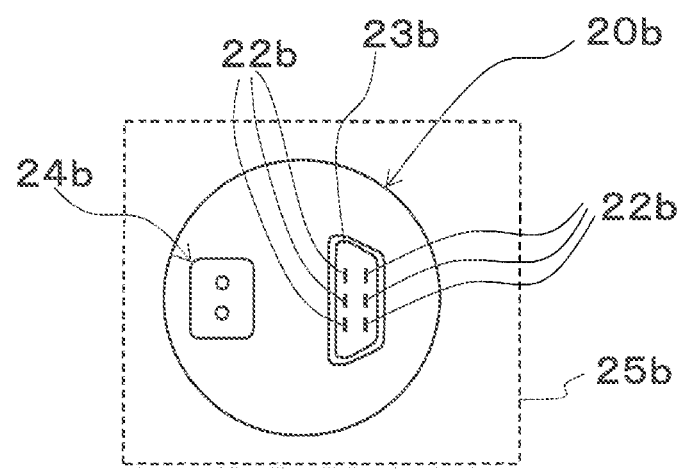
FIG. 4 is a bottom view of a modification of the measuring device of the second embodiment as seen from inside of the fuel tank.

It should be noted, as shown in FIG. 4, that the shape of a fuel measuring unit 24b may be a shape other than a circular shape (i.e. a rectangular shape with chamfered edges). Further, the shape of a socket 23b and the number of electrical connector 22b may be different from those of Embodiment 1.

Third Embodiment

Figure 5A:
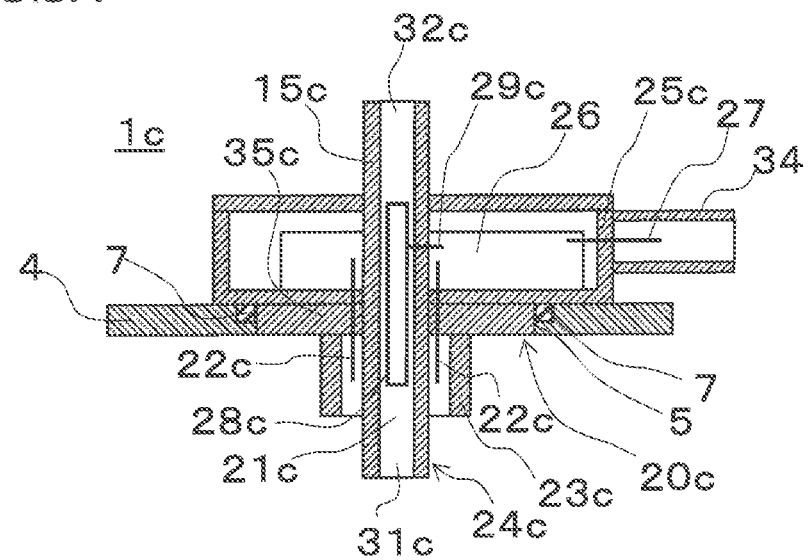
FIG. 5A shows a configuration of a measuring device of a third embodiment.
Figure 5B:
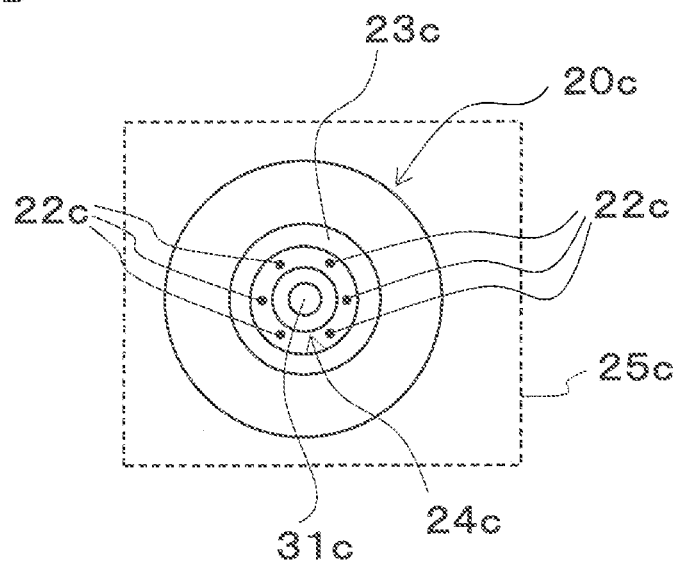
FIG. 5B is a bottom view of the measuring device of the third embodiment as seen from inside of the fuel tank.

A measuring device 1c of a third embodiment is described with reference to FIGS. 5A and 5B. As shown in FIGS. 5A and 5B, the measuring device 1c of the third embodiment differs from the measuring device 1a of the second embodiment in that a socket 23c into which an electrical connecting unit is plugged and a discharge pipe 15c through which fuel is supplied to the engine are concentrically disposed. That is, the discharge pipe 15e pierces through a plug 20c, and extends from the inside to the outside of the fuel tank 2. A fuel property sensor 28c is disposed inside of the discharge pipe 15c. The socket 23c is provided around the discharge pipe 15e. The discharge pipe 15c and the socket 23c are concentrically disposed, an electrical connector 22c is provided around the discharge pipe 15e.

The measuring device 1c of the third e also makes it possible to reduce the number of seal areas and thereby improve the airtightness of the fuel tank 2. Further, since the discharge pipe 15c and the socket 23c are concentrically disposed, the area of a fitting unit 35c can be made smaller. Therefore, this makes smaller the area of a seal face of the fitting unit 35c (i.e. an inner circumferential surface of the through hole 5), thus further improving airtightness.

Fourth Embodiment

Figure 6A:
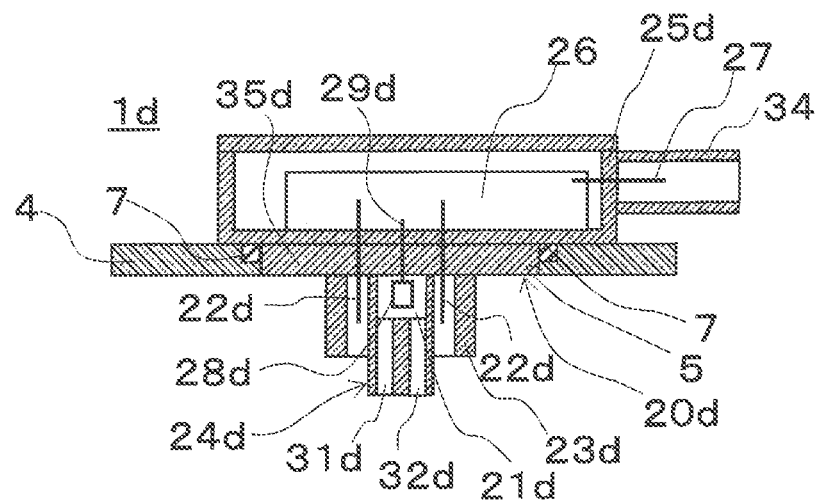
FIG. 6A shows a configuration of a measuring device of a fourth embodiment.
Figure 6B:
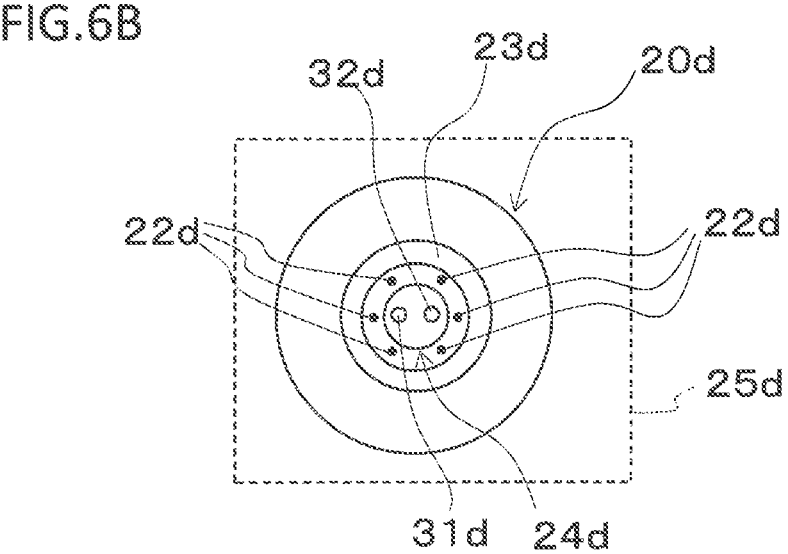
FIG. 6B is a bottom view of the measuring device of the fourth embodiment as seen from inside of the fuel tank.

A measuring device 1d of a fourth embodiment is described with reference to FIGS. 6A and 6B. As shown in FIGS. 6A and 6B, in the measuring device 1d of the fourth embodiment, unlike in the measuring device 1c of the third embodiment, a fuel measuring unit 24d Which is the same as the fuel measuring unit 24 of the first embodiment is concentrically disposed inside of a socket 23d. Therefore, the excess of fuel from the pressure regulator is supplied to the fuel measuring unit 24d, and the fuel property of the excess of fuel is detected by a fuel property sensor 28d. It should be noted that the excess of fuel supplied to the fuel measuring unit 24d flows through the fuel measuring unit 24d, and is returned to the fuel tank 2. As with the measuring device 1c of the third embodiment, the measuring device 1d of the fourth embodiment makes it possible to make the area of a seal face smaller and thereby improve the airtightness of the fuel tank 2.

Fifth Embodiment

Figure 7A:
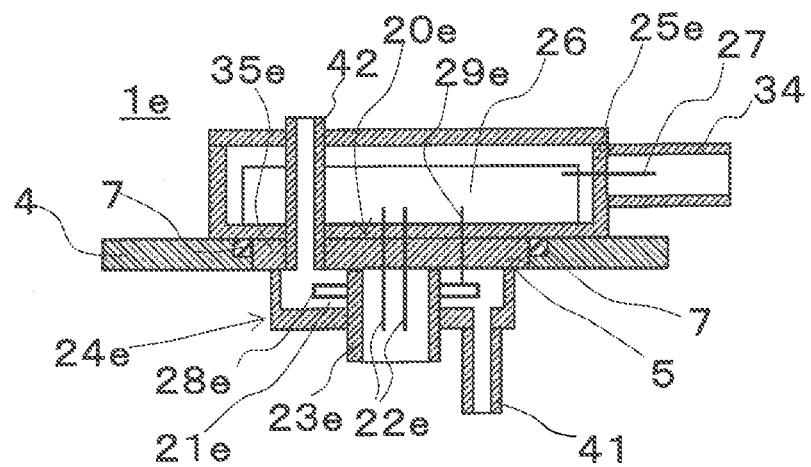
FIG. 7A shows a configuration of a measuring device of a fifth embodiment.
Figure 7B:
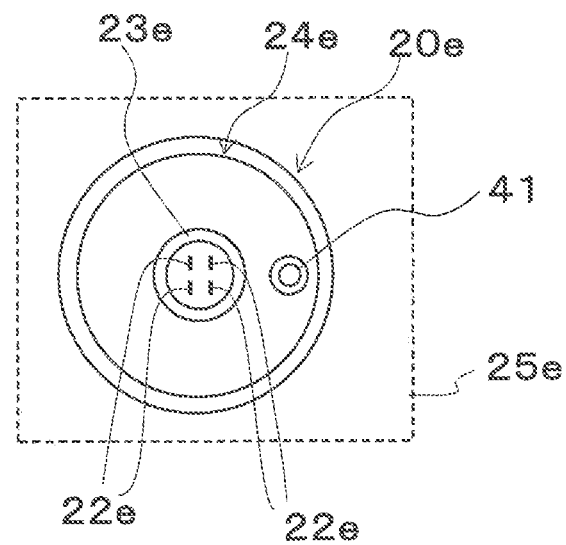
FIG. 7B is a bottom view of the measuring device of the fifth embodiment as seen from inside of the fuel tank.

A measuring device 1e of a fifth embodiment is described with reference to FIGS. 7A and 7B. As shown in FIGS. 7A and 7B, in the measuring device 1e of the fifth embodiment, a fuel measuring unit 24e is provided outside of a socket 23e. The socket 23e and the fuel measuring unit 24e are concentrically disposed.

The fuel measuring unit 24e comprises an inflow passage 41, an internal space 21e, and an outflow passage 42. The inflow passage 41 opens to the inside of the fuel tank 2, the first fuel tubing 13 is connected to an inlet of the inflow passage 41. The outflow passage 42 pierces through a fitting unit 35e, its outlet is connected to the engine through a fuel tubing. The internal space 21e is provided as to surround the socket 23e when seen in planar view. Therefore, the fuel from the fuel pump unit 9 is supplied to the engine through the first fuel tubing 13, the inflow passage 41, the internal space 21e, and the outflow passage 42. A fuel property sensor 28e is housed in the internal space 21e. The fuel property sensor 28e detects a fuel property of the fuel flowing through the internal space 21e.

The measuring device 1e of the fifth embodiment also, makes it possible to reduce the number of seal areas and thereby improve the airtightness of the fuel tank 2. Further, since the fuel passages (i.e. the internal space 21e and the outflow passage 42) are disposed in the vicinity of the control circuit 26, the control circuit 26 can be cooled by the fuel flowing through the fuel passages 21e and 42.

Sixth Embodiment

Figure 8A:
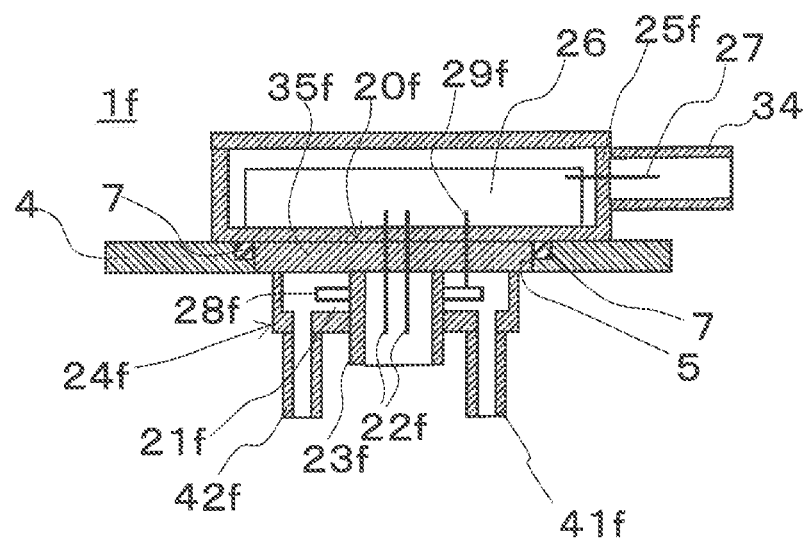
FIG. 8A shows a configuration of a measuring device of a sixth embodiment.
Figure 8B:
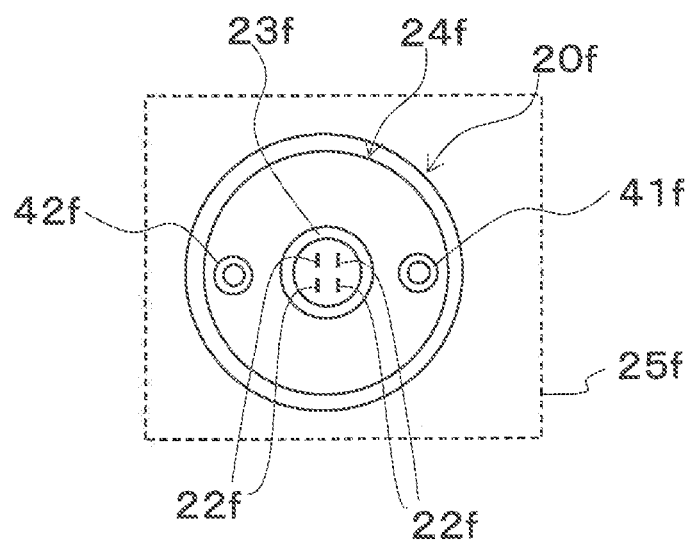
FIG. 8B is a bottom view of the measuring device of the sixth embodiment as seen from inside of the fuel tank.

A measuring device if of a six embodiment is described with reference to FIGS. 8A and 8B. As shown in FIGS. 8A and 8B, in the measuring device if of the sixth embodiment as well, a fuel measuring unit 24f is provided outside of a socket 23f However, in the measuring device 1f of the sixth embodiment, the fuel measuring unit 24f differs in that it is supplied with an excess of fuel from the pressure regulator of the fuel pump unit 9 and returns the excess of fuel into the fuel tank 2. That is, the fuel measuring unit 24f has an inflow passage 41f and an outflow passage 42f both of which are configured to open to the inside of the fuel tank 2. The second fuel tubing 16 is connected to the inflow passage 41f. The excess of fuel from the pressure regulator flows into the inflow passage 41f through the second fuel tubing 16, passes through the internal space 21f, and is returned into the fuel tank 2 through the outflow passage 42f. A fuel property sensor 28f is disposed in the internal space 21f. The fuel property sensor 28f detects a property of the fuel flowing through the internal space 21f. The measuring device if of the sixth embodiment also brings about substantially the same working effect as that which is brought about by the measuring device 1e of the fifth embodiment.

In the embodiments shown in FIGS. 3A through 8B, components identical in configuration to those of the embodiment shown in FIG. 2A are given the same reference signs. Meanwhile, components partially different in configuration from those of the embodiment shown in FIG. 2A are given the same reference signs as those given to the corresponding components of the embodiment shown in FIG. 2A, with the addition of a, b, c, d, e, or f thereto.

What is claimed is:

1. A measuring device comprising:
   a cover configured to close an opening provided on a fuel tank;
   a plug configured to close a through hole provided on the cover; and
   a sensor configured to measure a property of fuel inside the fuel tank,
   wherein
   the plug comprises:
       an electrical connector pierces through the plug from an upper surface to a lower surface of the plug; and
       a fuel passage including an inlet configured to open to the inside of the fuel tank to receive the fuel from the inside of the fuel tank,
       one end of the electrical connector on an upper surface side is connected to a control circuit disposed at an outside of the fuel tank,
       another end of the electrical connector on a lower surface side is connected to an electrical equipment disposed in the inside of the fuel tank via a lead wire,
       the electrical equipment is configured to be driven by a power of an external power source,
   the sensor is disposed in the fuel passage of the plug, and
   the fuel passage includes an outlet that is configured to open to the inside of the fuel tank to discharge the fuel from the fuel passage to the inside of the fuel tank.

2. The measuring device according to claim 1, wherein
   the sensor is connected to the control circuit
   the plug further comprises a circuit housing configured to house the control circuit, and in a case where the plug is assembled into the cover, the control circuit housed in the circuit housing is located on the plug on the outside of the fuel tank.

* * * * *